Nov. 15, 1949 — E. B. PHILLIPS — 2,487,942
SYSTEM ANALYZER
Filed May 13, 1946 — 2 Sheets-Sheet 1

WITNESSES:

INVENTOR
Emory B. Phillips
BY
Stebbins, Blenko & Webb
ATTORNEYS

Nov. 15, 1949     E. B. PHILLIPS     2,487,942
SYSTEM ANALYZER

Filed May 13, 1946     2 Sheets-Sheet 2

WITNESSES:     INVENTOR
Emory B. Phillips
BY
Stebbins, Blenko & Webb
ATTORNEYS

Patented Nov. 15, 1949

2,487,942

UNITED STATES PATENT OFFICE 2,487,942

SYSTEM ANALYZER

Emory B. Phillips, Stillwater, Okla.

Application May 13, 1946, Serial No. 669,441

11 Claims. (Cl. 171—97)

This invention relates to system analyzers, sometimes called calculating boards.

System analyzers or calculating boards have been used for many years to determine certain variables, i. e., voltage, current or power flow at different points in an electric power system under a variety of conditions. Such analyzers usually comprise a plurality of impedances of variable magnitude adapted to represent, in miniature, the various elements of a distribution system such as the generators, synchronous condensers, transformers, current-limiting reactors, the loads at various points in the system and the transmission lines connecting these various elements. By connecting these impedances in proper relation, it is possible to set up a miniature network simulating the actual system and, by applying appropriate voltages to various points therein, to determine the voltages existing at, the current flowing through and the power consumed by various elements of the system as well as the reactive volt-amperes delivered thereto. The values of the impedances and voltages of the miniature network are proportioned to those of the actual system.

Most of the elements included in an actual distribution system have a low ratio of resistance to reactance. For heavy-duty, high-voltage transmission lines this ratio is of the order of .35. For generators, transformers and limiting reactors the ratio is as low as .02. It is difficult, for several reasons, to construct miniature impedances having these low ratios of resistance to reactance. In the first place, it is desirable that the resistance of a miniature network element be concentrated largely in a resistor having a very low or zero temperature coefficient, in order to avoid variations resulting from temperature changes. The resistance of the reactive portion of the impedance, for example, should preferably be no more than one-fifth or one-fourth of the resistance of the resistor forming part of the impedance. In the second place, the reactors forming part of the impedances should have substantially constant reactance regardless of current variations so their magnetic circuits are not continuous but include air gaps. Proper excitation of a magnetic circuit including an air gap requires a winding having a greater number of turns than would be necessary if the air gap were not present, thus further increasing the difficulty of obtaining a low ratio of the resistance of the reactive portion of the impedance to the reactance. As a result, the reactors which are used in combination with resistors in miniature networks to represent system impedances, should have a ratio of resistance to reactance of around .08 for high-voltage, heavy-duty transmission lines. This ratio is obtainable but requires the use of wire of a larger size than necessary to carry the currents involved.

Miniature reactors if made to accurately represent generators and transformers would have an even lower ratio of resistance to reactance, i. e., of the order of .007. It is not practical to achieve such a low ratio and consequently generators and transformers are not properly represented in system analyzers as heretofore constructed.

I have invented a novel system analyzer which overcomes the defects and disadvantages of known analyzers indicated above. Instead of using, in the miniature network, impedances having the same angles, i. e., ratio of resistance to reactance, as the actual system elements represented, I employ in the miniature network impedances having an angle less than those of the actual system elements to which the miniature network elements correspond. In other words, I construct the elements of the miniature network with a greater ratio of resistance to reactance than those of the corresponding elements of the actual system. This, of course, causes a change in the phase angle between the voltage across the miniature network impedance and the current therethrough as compared to the angle between the voltage across an actual system element and the current therethrough. In order to preclude a false indication on a wattmeter connected to the miniature network to show the power flowing through an impedance thereof, I provide the potential circuit of the meter with a capacitive reactance sufficient to cause the current therethrough to lead the voltage by an angle sufficient to compensate for the disturbance of the normal current-voltage relation resulting from the fact that the miniature network impedance has an angle less or a ratio of resistance to reactance greater than that characteristic of the corresponding element of the actual system. I also modify the potential circuit of a varmeter to compensate for the altered current-voltage relation.

Further details, novel features and advantages of the invention will become apparent during the following complete description and explanation thereof which refer to the accompanying drawings illustrating diagrammatically a preferred embodiment and the current-voltage relations in an actual system element, a miniature network element and the metering circuits. In the drawings, Figure 1 is a schematic diagram of a miniature network representing a very simple actual distribution system;

Figure 1:
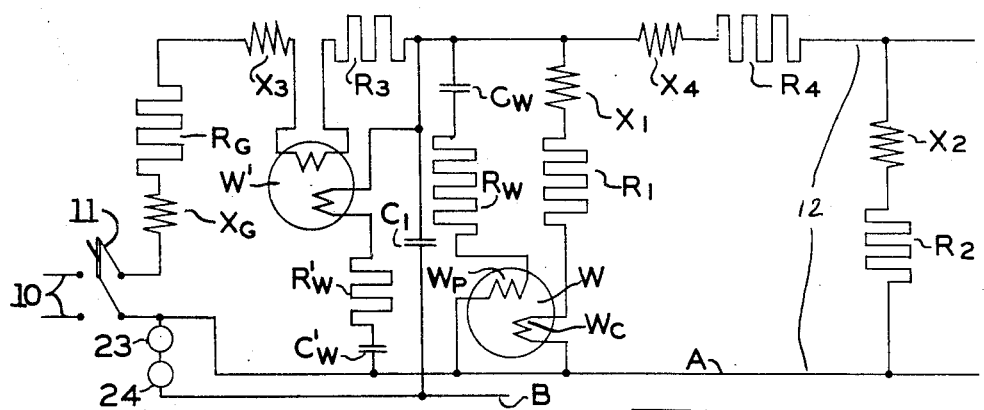

Referring in detail to the drawings and, for the present, to Figure 1, I have there illustrated a network of impedances simulating an extremely simple power system. The miniature network includes a current source 10 which is preferably a transformer connected to an ordinary 110-volt, 60-cycle distribution circuit. A switch 11 connects the source 10 to the miniature network. In the miniature network, the current source takes the place of the generator in the actual system. The transformer preferably has taps affording a choice of secondary voltages. A reactor $X_g$ and a resistor $R_g$ connected in series provide an impedance $Z_g$ corresponding to that of a generator in the actual system. The miniature network includes a circuit 12 representing the transmission line of an actual system extending from the generator to a plurality of loads connected thereacross.

The loads on the actual system are represented in the miniature network by impedances connected across the circuit 12. One of these impedances $Z_1$ is composed of a reactor $X_1$ and a resistor $R_1$ and the other, $Z_2$, of a reactor $X_2$ and a resistor $R_2$. An impedance $Z_3$ representing that of the actual transmission line between the generator and the first load is connected in the circuit 12 and comprises a reactor $X_3$ and a resistor $R_3$. Similarly, the impedance of the line between the first load and the second is represented by an impedance $Z_4$ composed of a reactor $X_4$ and a resistor $R_4$. All impedances are shown for convenience as connected in the upper side of circuit 12, the lower side serving as a common return bus A.

Figure 2:
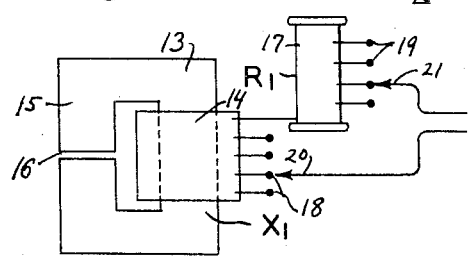
Figure 2 is a diagrammatic view illustrating a reactor and a resistor comprising one of the variable impedances adapted to represent the impedances of various portions of a distribution system.

Figure 2 illustrates diagrammatically one of the impedances of the miniature network. It comprises a reactor 13 including a winding 14 and a core 15 having an air gap 16, and a resistor 17 formed of wire non-inductively wound on a tube. The reactor and resistor have multiple taps 18 and 19 and moving contacts 20 and 21 cooperating therewith so that the value of the impedance may be varied to represent that of an element of an actual power system.

Figure 3:
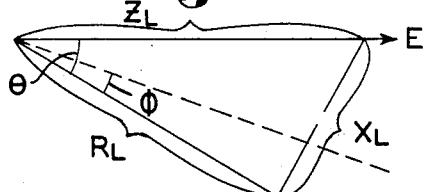
Figure 3 is a vector diagram showing the relations between the voltage across an actual system element and the current therethrough.

Figure 3 illustrates graphically the impedance of an element in the actual system and the relation between the voltage thereacross and the current therethrough. It may be assumed, for example, that the impedance illustrated in Figure 3 is that of the load to which the impedance $Z_1$ of the miniature network corresponds. In that case, the resistance of the actual load is indicated in Figure 3 by $R_L$, the reactance by $X_L$ and the impedance by $Z_L$. With these values, the current I through the load lags behind the voltage E thereacross by an angle $\theta$, the cosine of which, of course, is the power factor of the load.

Figure 4:
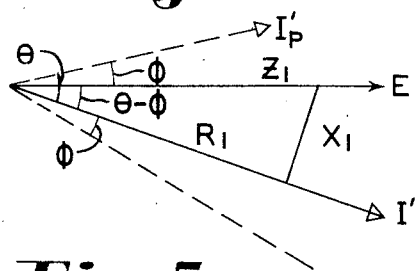
Figure 4 is a similar diagram showing the altered relation between the voltage across and the current through a corresponding miniature network impedance.

In constructing the impedances of the miniature network representing a given load on the actual system, I depart from the ratio of resistance and reactance existing in the element of the actual system so that the miniature network impedance has a higher ratio of resistance to reactance or, in other words, a smaller impedance angle than the element of the actual system. To this end, I arbitrarily deduct a certain angle $\phi$, say 25° or 30°, from the impedance angle of the actual system element. This can be done, of course, by appropriately increasing the resistance and reducing the reactance of the miniature network impedance. Figure 4 shows in dotted lines how the ratio of resistance to reactance may thus be varied to reduce the angle $\theta$ by the angle $\phi$, without altering the actual value of the impedance.

All the impedances of the miniature network have their ratios of resistance to reactance increased, as compared to the ratios of the actual system elements, by the same proportional amount. That is to say, the impedance angles of all the miniature network impedances are reduced by the same angle, as compared to the impedance angles of the actual system elements. It will be evident that the reduction of the impedance angles of the miniature network impedances causes a change in the voltage-current relations or power factor which would cause a wattmeter connected to an impedance of the miniature network to show a higher reading than that corresponding to the power consumed by the actual system element under the same conditions. To avoid such a false indication, I modify the potential circuit of the wattmeter used in the miniature network so as to restore the proper relation between the current and voltage, thus producing a true reading on the meter.

A wattmeter W is arranged for metering the power consumed by any of the elements of the miniature network. As shown, it has its current winding $W_c$ connected in series with the miniature network impedance $Z_1$. The potential coil $W_p$ of the meter is connected across the circuit 12 in series with the usual current-limiting resistor $R_w$. I insert in this circuit a condenser $C_w$ of such capacity as to cause the current through the potential coil $W_p$ to lead the voltage across the circuit 12 by the angle $\phi$. I also reduce the value of $R_w$ so that the overall impedance of the potential circuit is not changed. This compensates exactly for the advance of the current through the impedance $Z_1$ resulting from the fact that the ratio of resistance to reactance is greater than that characteristic of the corresponding element of the actual system. This is graphically illustrated in Figures 4 and 5.

Figure 5:
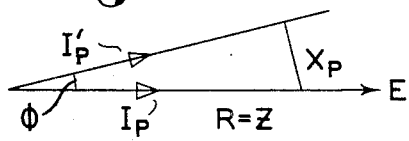
Figure 5 is a vector diagram showing the current-voltage relations in the potential circuit of a wattmeter connected to an impedance of the miniature network.

As shown in Figure 4, the impedance angle of the combination of reactor $X_1$ and resistor $R_1$ is $\theta'$ or $\theta-\phi$. Figure 5 shows the effect of the condenser C on the current through the potential coil of the wattmeter. Without the condenser, this current would be in phase with the voltage as indicated at $I_p$, since there is practically no reactance in the potential circuit of a wattmeter. The condenser introduces a negative reactance $X_p$ in the circuit and this reactance is of such value as to cause the current through the potential coil of the wattmeter to lead the voltage by the angle $\phi$ as indicated at $I_p'$. This current is shown as a dotted vector in Figure 4 to indicate that the angle between it and the current through the current coil $W_c$ is the angle $\theta$ which is the power-factor angle of the actual load, whereby the wattmeter reads the correct value of the power through the load.

A wattmeter W' similar to W is shown connected to measure the power consumed by the line impedance $Z_3$, composed of $R_3$ and $X_3$.

It is frequently desirable in system analyzers to determine the reactive volt-amperes required by various loads. This quantity may be measured by a so-called varmeter which includes in its potential circuit an impedance such as to give the circuit an impedance angle of 90°. I modify the potential circuit of a conventional varmeter for use with the system analyzer of my invention by reducing the impedance angle thereof by the same angle $\phi$, by which the impedance angles of the miniature network impedances are reduced. This is accomplished by a suitable combination of resistance and reactance in the potential circuit of the varmeter to give the proper phase relation of the current therein to the current through the current coil, without changing the magnitude of the impedance of the potential circuit. This may be explained further by reference to Figures 6 and 7.

Figures 6, 7:
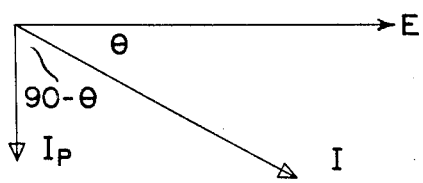
Figure 6 is a vector diagram showing the current-voltage relations in the potential circuit of a conventional varmeter.
Figure 7 is a similar diagram showing the altered current-voltage relations by which I compensate for the fact that the current-voltage relations in the miniature network impedance are not identical with those of the corresponding element of the actual system.

In Figure 6, the current I through an impedance of the miniature network lags the voltage E by angle $\theta$. This current, of course, or one proportional to it, flows through the current coil of the varmeter. The current through the potential coil, $I_p$, is in quadrature with the voltage E and is lagging in the illustrated example. It also lags the current through the current coil of the varmeter by the angle $90-\theta$. By including sufficient resistance in the potential circuit of the varmeter, the current through the potential coil may be advanced by the angle $\phi$ from the quadrature position relative to the voltage E shown in Figure 6. This condition is shown in Figure 7 in which the current through the potential coil is designated $I_p'$. The current $I_1$ through the impedance $Z_1$ of the miniature network, for example, is advanced from the position of the current I of Figure 6 by angle $\phi$ because of the change in the ratio of resistance to reactance as compared to the corresponding element of the actual system. The current $I_p'$ having been advanced by exactly the same angle, the angle between $I_1$ and $I_p'$, is exactly the same as the angle between the current I and the current $I_p$. Thus the indication of the varmeter is corrected for the difference between the ratios of resistance to reactance in the miniature network as compared to the actual system element.

Shunt-connected capacitors, are required to simulate the lumped capacitance effect of all transmission lines terminating on a substation bus. The desired effect can be obtained in the analyzer network by combining this negative reactance with the load constants for the particular bus or a capacitor unit can be connected in parallel with the load unit. In some instances the latter is preferred and in a few cases it is necessary due to the small size of the load. At load points where it is undesirable to combine the lumped capacity effect of transmission lines terminating at the load point with the constants of the load, the capacity effect can be represented in equivalency by either of the two methods.

Figure 9:
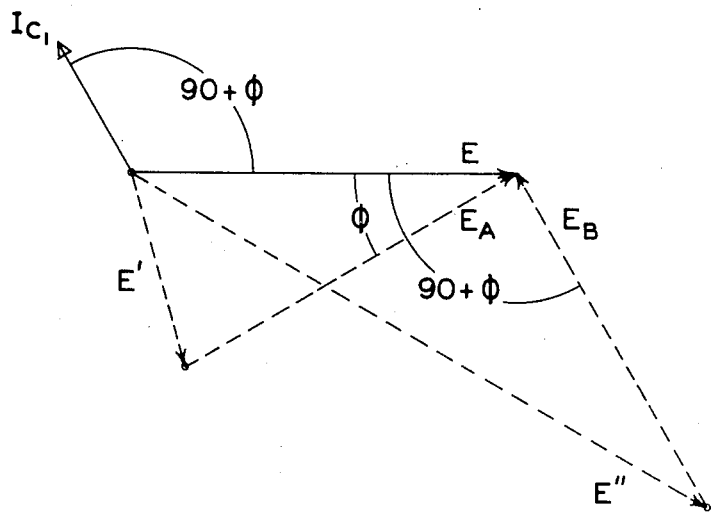
Figure 9 is a vector diagram showing conditions in the circuits of Figure 1 and Figure 8.

In order to maintain the advancement of the currents throughout all parts of the miniature network, the currents in the shunt-connected capacitors should lead the voltage applied to them by an angle of $90+\phi$ degrees. If the voltage E at the load point were used to produce this current in the capacitor, it would require the use of a negative resistance, or the equivalent of inserting a generated voltage of the proper value and phase angle in series with the capacitor. In order to avoid the use of this voltage at each and every point where capacitors are to be connected, instead of connecting the capacitor as would be done customarily between the point in question and the common-return bus indicated at A in Figure 1, I connect the capacitor, indicated at $C_1$, between the point and an auxiliary bus, shown at B. A generated voltage E', produced by the combined action of a phase shifter 23 and a voltage regulator 24 is introduced between the auxiliary bus and the common-return bus, of such magnitude and phase relation as to give a resultant voltage, $E_a$, between the load point and the auxiliary bus, equal to the voltage E but leading it by $\phi$ degrees, as shown in Figure 9. Therefore, condenser $C_1$ connected between the load point and the auxiliary bus will draw a current from this point which leads the voltage E by an angle of $90+\phi$ degrees. The effect upon the network will be equivalent to connecting a circuit device between the point and the common-return bus A which would draw a current having a phase angle $90+\phi$ degrees leading the voltage E, as shown at $I_{c_1}$ in Figure 9.

This auxiliary bus B can be used as the return bus for condensers similarly connected at other load points in the network with only a negligible error resulting in the magnitude and phase angle of the current in any other condenser because of the small variation in the voltages and phase angles of these voltages from point to point in a system network. Therefore, this auxiliary bus constitutes a common-return bus used for the connection of all shunt-connected condensers at points in the network whereat the capacity effect is not combined with the constants of the load, or in those places where no load exists.

Figure 8:
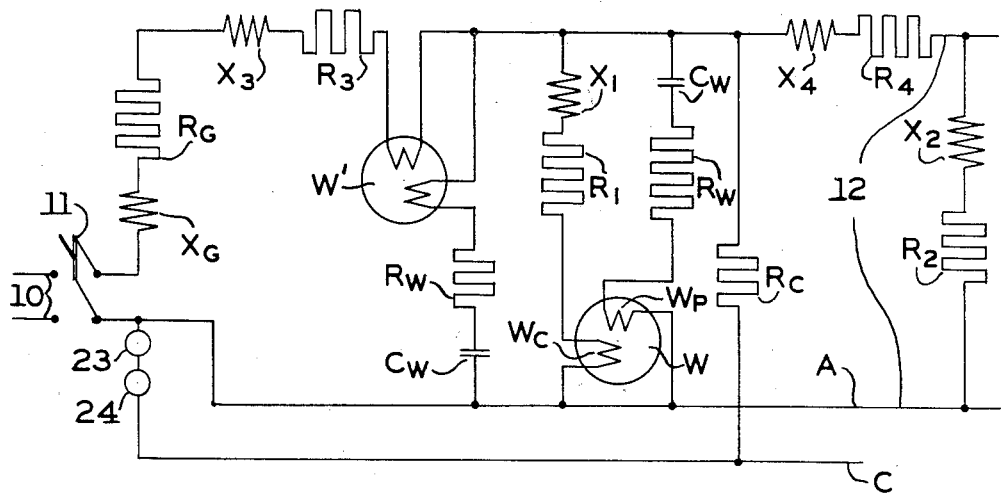
Figure 8 is a circuit diagram similar to Figure 1 showing a slight modification.

To produce the capacitance effect required at any point in the network it is only necessary to draw from this point a current that will lead the voltage E at the point by an angle of $90+\phi$ degrees. In the method just described this was accomplished by the use of a capacitor connected between the load point, or any point, and bus B, the voltage of which, $E_a$, leads E by $\phi$ degrees. Now if a generated voltage, E'', inserted between the bus A and the bus B, is adjusted to such magnitude and phase angle that a resulting voltage $E_b$ exists between a given point in the network and the bus B of magnitude equal to E but leading the voltage E by $90+\phi$ degrees, a resistor, $R_c$, having the same number of ohms as the capacitive reactor required, may be connected between the point and bus C as shown in Figure 8, with the result that the current flowing through this resistor, $I_{c_1}$ will lead the voltage E by 90+ϕ degrees. Under such conditions the effect on the network will be the same as that produced in the first method. The advantage of such an arrangement lies in the considerable reduction of costs since the cost of the resistor is much less than that of a capacitor. An additional advantage is the relative ease with which resistor units can be made continuously adjustable whereas capacitor units, except for the extremely small capacity, air-dielectric type which are not applicable to these networks, are adjustable only in definite steps.

The bus C can also be used as the return bus for capacitor-simulating resistors connected at other points in the network with only a negligible error resulting in the magnitude and phase angle of the current in other capacitor-simulating resistors because of the small variation of the magnitude and phase angle of the voltage E from point to point in a system network. Under these new conditions the bus C constitutes a common-return bus for the connection of all shunt-connected, capacitor-simulating resistors connected to points in the network whereat the capacity effect of the lines are not combined with the constants of the load or at those points where no load exists.

The invention is characterized by numerous advantages over network analyzers used heretofore. In the first place, it permits a reduction in the amount of material needed for both the windings and cores of the reactors of the miniature network. Overall reductions of from 35% to 45% in the weight of the reactors of impedances designed to represent transmission lines may be effected. An even larger reduction may be made in the weight of the reactors of impedances designed to represent synchronous machines, transformers, current-limiting reactors and other apparatus having a low ratio of resistance to reactance. The saving of wire results from the fact that the wire need not be any larger than necessary to carry the current, in order to keep the resistance down as was necessary heretofore. A reduction in the core weight results from the lower reactance required. Since the number of such reactors embodied in an analyzer is quite large, the total saving is considerable.

A further advantage of the invention is that it makes possible the accurate representation in a system analyzer of certain elements of an actual system which have heretofore been simulated only approximately, i. e., elements having very low ratios of resistance to reactance such as .005. The invention avoids the much greater loss occurring in an analyzer unit which only approximately represents the actual system unit, than actually occurs in the latter. In some cases, for example, the loss in the system analyzer unit has been eight to ten times that of the corresponding actual unit.

In certain cases, the representation of an actual system in a miniature network requires impedances having angles greater than 90°. This involves the simulation of negative resistance which heretofore has required complex electronic devices. By utilizing my invention and reducing the angles of the impedances, they are brought down to less than 90° and can thus be represented by conventional reactors and resistors. In this way, the invention permits the representation in the analyzer of impedances of an actual system having angles as high as 119°.

To summarize, by representing the elements of an actual power system by impedances having the same magnitudes but reduced angles, a considerable saving in the cost and size of the reactors of the miniature network can be obtained without any effect upon the electrical indications given by the various instruments used for measuring the quantities in the miniature network. The numerical value of all measurements as well as the vector value and relations of all voltages and currents will be correct. In addition to the advantages of reduced cost and size, the invention makes it possible to represent accurately on the miniature network those system elements whose impedances have very large angles, such as generator and transformer impedances, and the impedance of limiting reactors. Shunted impedances, such as loads, can be represented by the use of impedances made up of a resistor and a condenser in parallel where the power factor is to be larger than the value of cosine ϕ. For power factors lower than cosine ϕ the load impedance will consist of a resistor and an inductive reactor in series.

Although I have illustrated but a preferred embodiment of the invention, it will be recognized that changes in the details thereof may be made without departing from the spirit of the invention or the scope of the appended claims.

I claim:

1. In a system analyzer, the combination with a plurality of impedances connected in a miniature network to represent elements of an electric power system, said impedances having smaller angles, i. e., greater ratios of resistance to reactance, than those of the elements of the actual system, of a wattmeter adapted to be connected to measure the power flowing through one of said impedances, the potential circuit of said wattmeter including a condenser compensating for the change of phase angle between the current through said one of said impedances and the voltage thereacross resulting from the smaller impedance angles.

2. In a system analyzer, the combination with a plurality of impedances connected in a miniature network to represent elements of an electric power system, the angles of said impedances (determined by the ratio if their resistance to their reactance) differing by a predetermined angle from the impedance angles characteristic of the actual elements of said system, of a wattmeter adapted to be connected to measure the power flowing through one of said impedances, the potential circuit of said wattmeter including a condenser effective to make the current therethrough lead the voltage by said predetermined angle.

3. In a system analyzer, the combination with a plurality of impedances connected in a miniature network to represent elements of an electric power system, the angles of said impedances (determined by the ratio of their resistance to their reactance) differing by a predetermined angle from the impedance angles characteristic of the actual elements of said system, of a varmeter adapted to be connected to measure the reactive volt-amperes flowing through one of said impedances, the potential circuit of said varmeter including a reactor effective to cause the current therethrough to lag the voltage thereacross by the difference between said predetermined angle and 90°.

4. In a system analyzer, the combination with a plurality of impedances connected in a miniature network to represent elements of an electric power system, the angles of said impedances (determined by the ratio of their resistance to their reactance) differing by a predetermined angle from the impedance angles characteristic of the actual elements of said system, of a wattmeter adapted to be connected to measure the reactive power flowing through one of said impedances, the potential circuit of said wattmeter including a reactance such as to give the potential circuit an impedance angle equal to the difference between 90° and said predetermined angle.

5. In a system analyzer, a plurality of impedances connected to a distribution circuit including a common return bus, each of said impedances comprising a resistor and reactor, the ohmic values of the resistance and reactance of the impedances being such as to give angles differing by the same amount from the impedance angles of the actual system elements represented thereby, a capacitor connected between one side of said circuit and an auxiliary bus, and means applying a voltage between said buses such as to cause the current through the capacitor taken from the point of its connection to said circuit, to lead the voltage between said point and the return bus by an angle of said amount plus 90°.

6. In a system analyzer, a plurality of impedances connected to a distribution circuit including a common return bus, each of said impedances comprising a resistor and reactor, the ohmic values of the resistance and reactance of the impedances being such as to give angles differing by the same amount from the impedance angles of the actual system elements represented thereby, a resistor connected between said circuit and an auxiliary bus to represent a capacitive element of an actual system, and means applying a voltage between said buses such as to cause current through the resistor taken from the point of its connection to said circuit, to lead the voltage between said point and said return bus by an angle of said amount plus 90°.

7. In a system analyzer constructed to reproduce on a smaller scale the electrical operating characteristics of a principal electric power system, a plurality of impedances connected in a miniature network to represent elements of the electric power system, each impedance comprising a resistor and reactor and the angle of each impedance (determined by the ratio of the resistance and the reactance of the impedance) differing from the impedance angle characteristic of the corresponding actual element of said system by a predetermined angle, the said predetermined angle of difference being equal for all of the said impedances.

8. In a system analyzer constructed to reproduce on a smaller scale the electrical operating characteristics of a principal electric power system, a plurality of impedances connected in a miniature network to represent elements of the electric power system, each impedance comprising a resistor and reactor and the angle of each impedance (determined by the ratio of the resistance and the reactance of the impedance) being less than the impedance angle characteristic of the corresponding actual element of said system by a predetermined angle, the said predetermined angle of difference being equal for all of said impedances.

9. In a system analyzer, the combination with a plurality of impedances connected in a miniature network to represent elements of an electric power system, the angles of said impedances (determined by the ratio of their resistance to their reactance) differing by a predetermined angle from the impedance angles characteristic of the actual elements of said system, of a wattmeter adapted to be connected to measure the power flowing through one of said impedances, the potential circuit of said wattmeter including a current phase-shifting network of impedance elements effective to make the current therethrough lead the voltage by said predetermined angle.

10. In a system analyzer, the combination with a plurality of impedances connected in a miniature network to represent elements of an electric power system, the angles of said impedances (determined by the ratio of their resistance to their reactance) differing by a predetermined angle from the impedance angles characteristic of the actual elements of said system, of a varmeter adapted to be connected to measure the reactive volt-amperes flowing through one of said impedances, the potential circuit of said varmeter including a current phase-shifting network of impedance elements effective to cause the current therethrough to lag the voltage thereacross by the difference between said predetermined angle and 90°.

11. In a system analyzer, a plurality of impedances connected to a distribution circuit including a common return bus, said impedances having angles differing by the same amount from those of the actual system elements represented thereby, a network of impedance elements connected between said circuit and an auxiliary bus to represent a capacitive element of an actual system, and means applying a voltage between said buses such as to cause current through the resistor taken from the point of its connection to said circuit, to lead the voltage between said point and said return bus by an angle of said amount plus 90°.

EMORY B. PHILLIPS.

REFERENCES CITED

The following references are of record in the file of this patent:

UNITED STATES PATENTS

| Number | Name | Date |
|---|---|---|
| 1,615,731 | Warner | Jan. 25, 1927 |
| 2,154,270 | Harder | Apr. 11, 1939 |